(12) United States Patent
Lenk et al.

(10) Patent No.: US 7,780,401 B2
(45) Date of Patent: Aug. 24, 2010

(54) ICE STRIKE SHEATHING RING FOR THE FAN CASING OF AN AIRCRAFT GAS TURBINE

(75) Inventors: Olaf Lenk, Berlin (DE); Uwe Dickert, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 616 days.

(21) Appl. No.: 11/882,631

(22) Filed: Aug. 3, 2007

(65) Prior Publication Data

US 2008/0075587 A1  Mar. 27, 2008

(30) Foreign Application Priority Data

Aug. 3, 2006  (DE) ........................ 10 2006 036 648

(51) Int. Cl.
*F02C 7/05* (2006.01)

(52) U.S. Cl. ............................. 415/9; 415/197; 415/200

(58) Field of Classification Search ..................... 415/9, 415/197

See application file for complete search history.

(56) References Cited

U.S. PATENT DOCUMENTS 4,699,567 A  10/1987 Stewart 5,431,532 A *  7/1995 Humke et al. .................. 415/9
6,059,524 A  5/2000 Costa

FOREIGN PATENT DOCUMENTS

| EP | 0 626 502 B2 | 4/1996 |
|---|---|---|
| EP | 0 795 682 B1 | 5/2000 |

* cited by examiner

*Primary Examiner*—Richard Edgar
(74) *Attorney, Agent, or Firm*—Timothy J. Klima; Shuttleworth & Ingersoll, PLC

(57) ABSTRACT

An ice strike sheathing ring (4) including several fiber compound layers for the fan casing of an aircraft gas turbine features breaking points (7) at a certain regular distance, so that, in case of destruction of the ice strike sheathing ring due to extreme ice strike, fragments of small size will be produced which together with the engine airflow will pass the exit guide vanes downstream of the fan without blocking the engine airflow or reducing engine thrust. With fiber compound layers enclosing a cavity or a core, the breaking points designed as slots (9) and/or assembly holes (8) are located in the inner wall (20) of the ice strike sheathing ring facing the engine airflow, while the outer wall (21) of the ice strike sheathing ring adjoining the fan casing is firmly attached to the latter via an adhesive film and a threaded safety connection.

14 Claims, 5 Drawing Sheets

ICE STRIKE SHEATHING RING FOR THE FAN CASING OF AN AIRCRAFT GAS TURBINE

Figure 1:
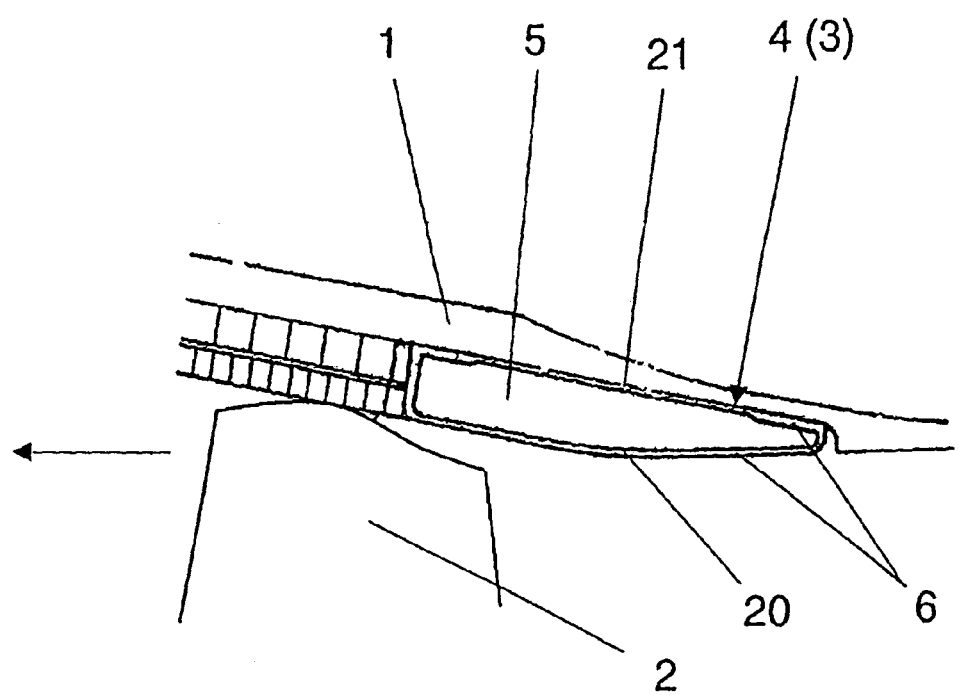

This application claims priority to German Patent Application DE 10 2006 036 648.4 filed Aug. 3, 2006, the entirety of which is incorporated by reference herein.

This invention relates to an ice strike sheathing ring for the fan casing of an aircraft gas turbine.

Aircraft engines are, among other things, operated under climatic conditions in which ice coats form on the aircraft which may later detach in the form of ice pieces of varying size. In addition, aircraft may also be required to fly in hail zones. The hailstones or ice pieces entering the engine are accelerated radially outwards by the rotation of the fan blades, striking the inner surface of the fan casing. If the detached ice particles or the hailstones exceed a certain size, the fan casing is likely to be damaged. In order to avoid damage to the engine due to ice strike, an ice strike protection sheathing is provided in the endangered area of the fan casing, i.e. a sheathing ring composed of a suite of segments disposed on the inner circumference of the fan casing. In order to limit the assembly costs, the sheathing ring is composed of a minimum number of individual segments, preferably six individually assembled 60-degree segments. The segments include several layers of fiber compound material which are connected to each other and are each continuous and enclose a cavity or a foam core. Also known are ice strike sheathings having segments with open cross-section made of honeycomb on which the surface facing the airflow is covered with a fiber compound material layer.

Under extreme or adverse weather conditions, the ice pieces entering the engine may be of such a size that the surface of the ice strike sheathing ring is destroyed and its upper part separated from the remaining structure. The separated parts are swept away with the engine airflow and get caught in the exit guide vanes of the fan. This may result in partial blockage of the engine airflow and, consequently, in loss of engine thrust.

In a broad aspect, the present invention provides for an ice strike sheathing ring having a few individual segments designed in such a way that flight safety is ensured even when weather conditions are extreme and large ice pieces or hailstones have formed.

Particular objects and advantageous developments of the present invention will become apparent from the description below.

The essential idea of the present invention is that the individual segments of the ice strike sheathing ring are provided with regularly spaced breaking points so that, under extreme ice impact, fragments of such limited size are separated from the ice strike sheathing ring that can pass the space between the exit guide vanes, thus avoiding blockage of engine airflow or loss of engine thrust.

The outer wall of the segments having several fiber compound layers, which adjoins the fan casing, is firmly connected to the fan casing while the breaking points are provided only in an inner wall facing the airflow.

The breaking points are formed by slots in the fiber compound layers of the inner wall and by assembly holes in the inner wall, with the assembly holes serving for attachment of the segments to the fan casing via a threaded safety connection. The outer fiber compound layer is not interrupted and the assembly holes are closed upon assembly of the ice strike sheathing ring.

The number of fiber compound layers interrupted by slots may vary and defines the amount of material weakening in the area of the breaking points. The slots in the individual fiber compound layers can be disposed one above the other or offset relative to each other.

In development of the present invention, the ice strike sheathing rings include six 60-degree segments with 10-degree spacing of the breaking points, with the two outer breaking points being formed by the assembly holes and the three breaking points between the assembly holes being formed by the slots (interruptions) in the fiber compound material.

The segments of the ice strike sheathing ring are attached to the fan casing by adhesive bonding and a threaded safety connection fitted to the assembly holes, with the assembly holes simultaneously acting as breaking points. The threaded safety connection includes a locking sleeve with elastic embedment which is located in a hole of the fan casing and rests on the segment, with the locking sleeve restraining the segment to the fan casing via locking bolt, locking adapter and locking nut. The assembly hole is closed via a blanking plate which is flush with the inner surface of the segments.

Figure 2:
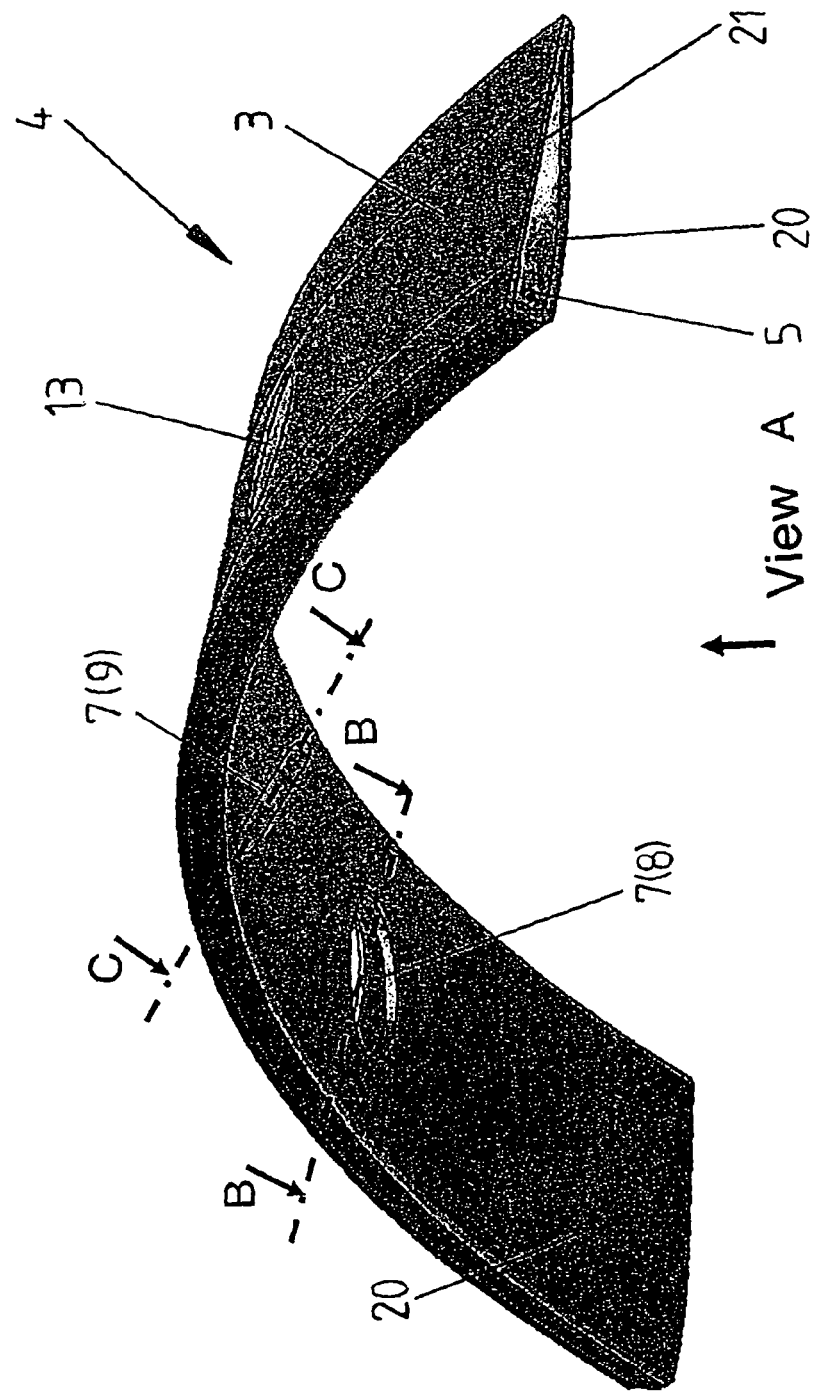
Figure 3:
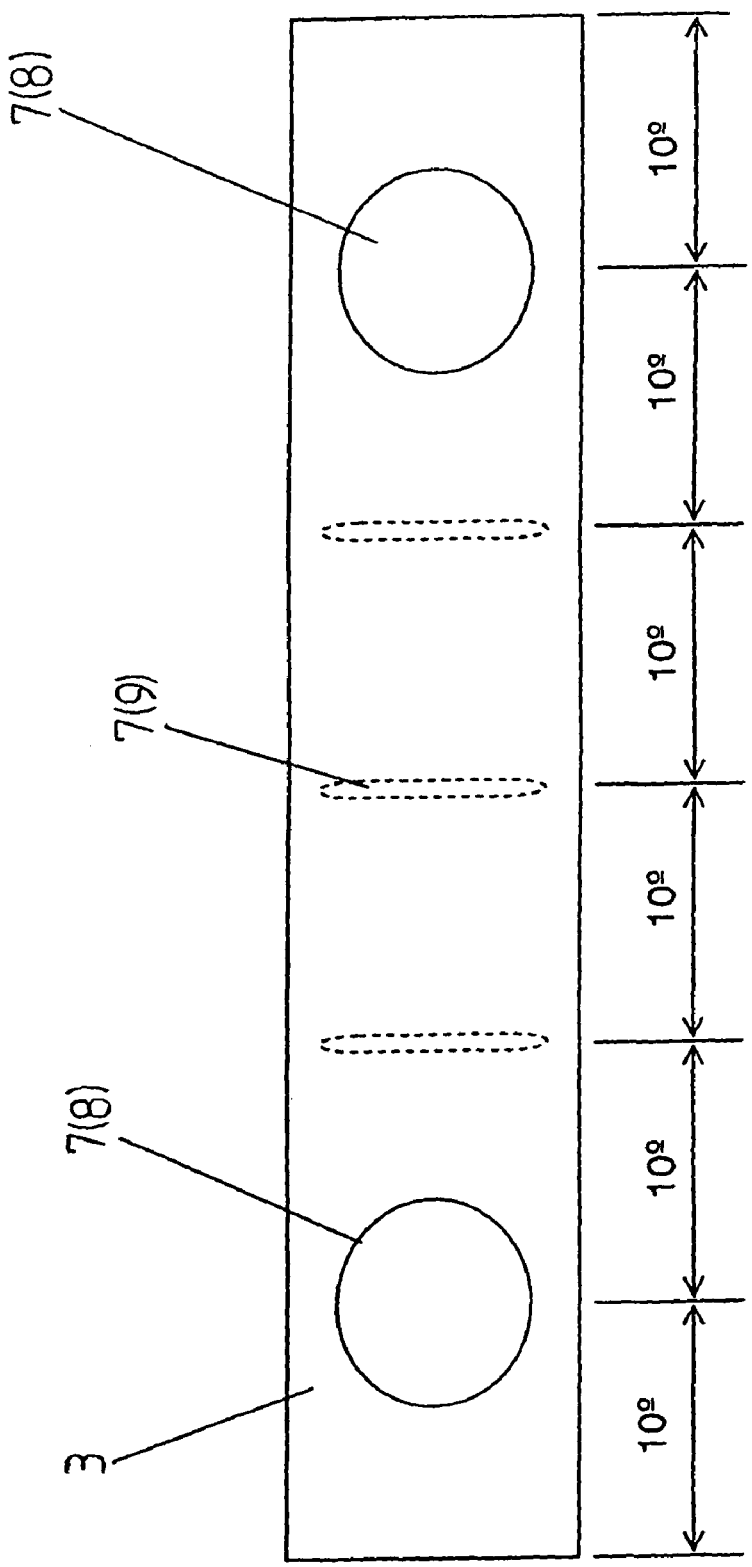
Figure 4:
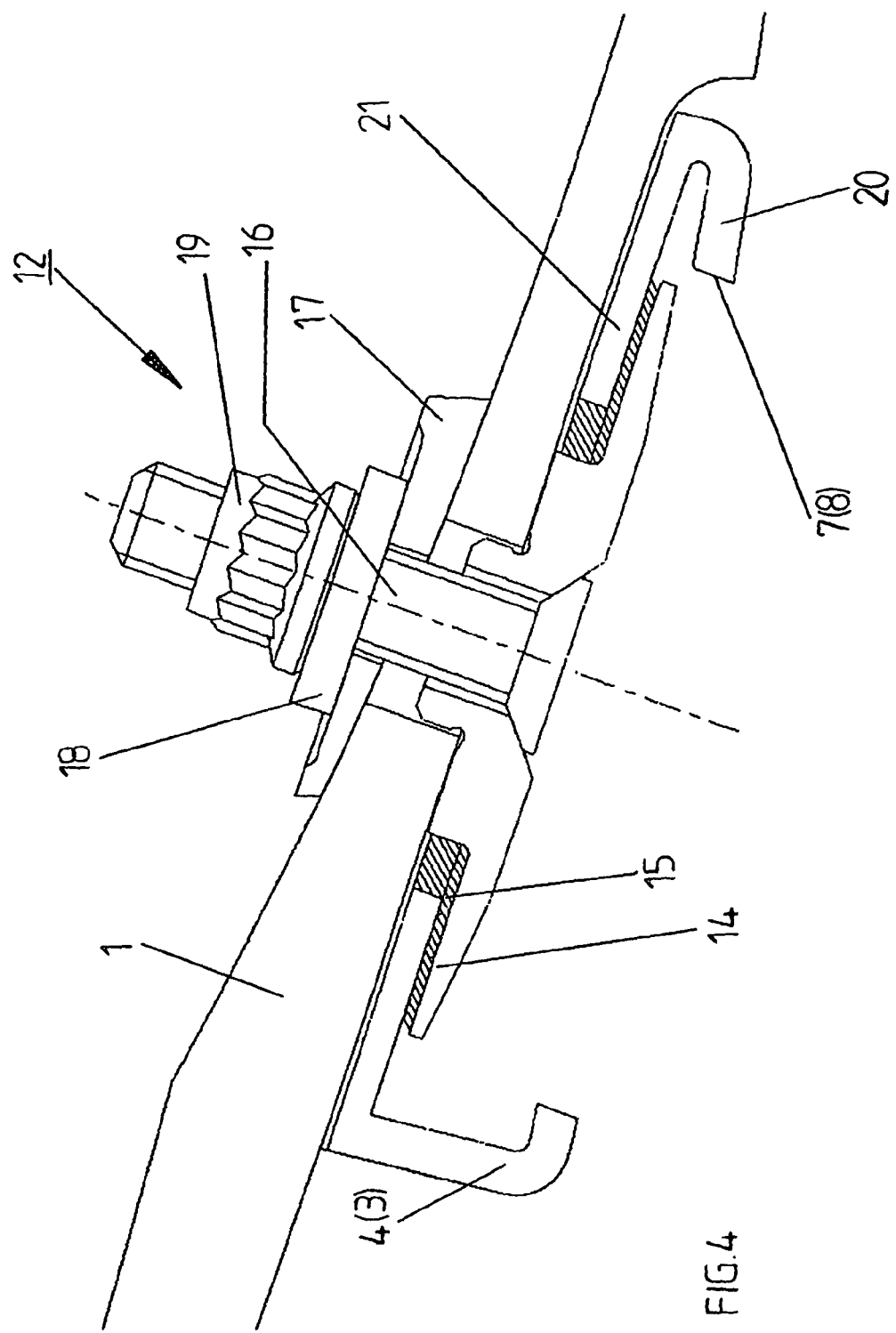
Figure 5:
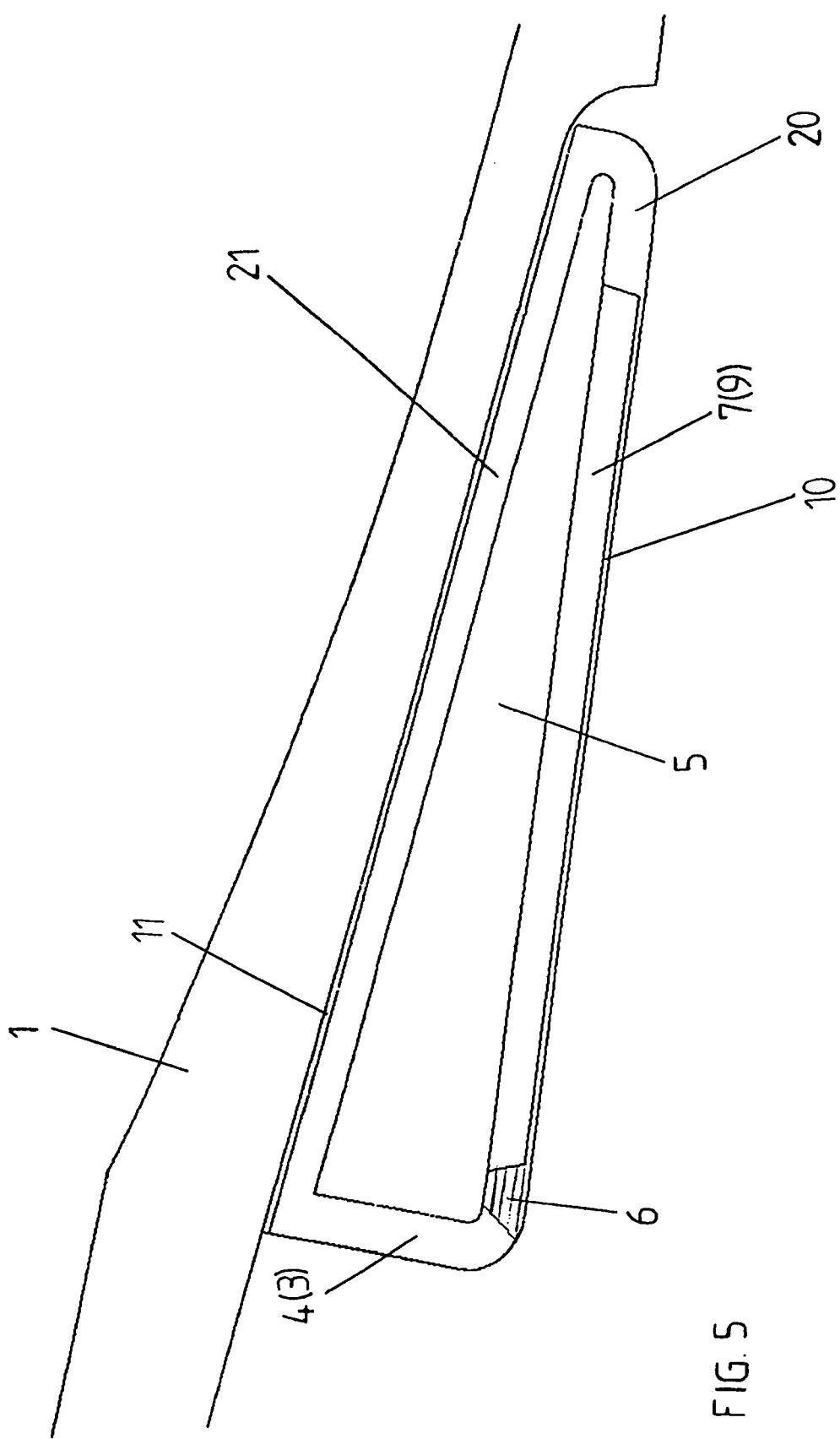

The present invention is more fully described in light of the accompanying drawings, showing a preferred embodiment. In the drawings, FIG. 1 is a partial sectional view of a fan casing provided with an ice strike sheathing ring, FIG. 2 is a perspective view of a segment of an ice strike sheathing ring, FIG. 3 is a view A of the segment of the ice strike sheathing ring in accordance with FIG. 2, FIG. 4 shows a section BB as per FIG. 1 with a threaded safety connection of the segment of the ice strike sheathing ring provided at the casing, and FIG. 5 shows a section CC as per FIG. 1 with a breaking point provided in the ice strike sheathing ring.

According to the partial illustration of an area of a fan casing 1 shown in FIG. 1, an ice strike sheathing ring 4 having six 60-degree segments is fitted in a portion of the fan casing 1 downstream of the fan 2. Each segment 3 of the ice strike sheathing ring 4 includes several fiber compound layers 6 enclosing a cavity 5 or a foam core which are provided with interruptions at 10-degree intervals to provide breaking points 7 at the inner side exposed to ice strike, as shown in FIG. 3. The breaking points 7, in the present embodiment, include assembly holes 8, these being located at a distance of 10 degrees to the ends of the segment 3 and used for installation of a threaded safety connection 12 to the fan casing 1, and axial slots 9 with 10-degree spacing between the assembly holes 8. However, for formation of the slots 9, the fiber compound layers 6 are preferably not interrupted at the airflow-wetted outer fiber compound layer 10 of the inner wall 20 of the segment 3. The individual fiber compound layers can be interrupted by an axial slot at one and the same location to provide a through-going breaking point 7, as shown in FIG. 5, or the interruptions (individual slots) in the individual layers can be offset relative to each other or be provided in only a part of the fiber compound layers. The arrangement and size of the interruptions as well as the number of the interrupted fiber compound layers define the amount of material weakening at the breaking point 7. The segments 3 are connected, on the outer wall 21, to the inner surface of the fan casing 1 via an adhesive film 11 and additionally secured via threaded safety connections 12. For attachment of the segments 3 via the threaded safety connection 12, assembly holes 8 disposed on their inner wall 20 and co-axially arranged smaller holes 13 in the outer wall 21 of the segments 3 are provided. The threaded safety connection 12 includes a wide-head locking bush 14 with elastic embedment 15 on the fiber compound material which is located in a cavity 5 and fixed in a hole of the fan casing 1 and is restrained at the outer side of the fan casing 1 via a locking bolt 16, an adapter 17, a washer 18 and a locking nut 19. The cavities remaining on the inner wall 20 of the segment 3 in the area of the assembly holes 8 are filled, for example with polysulfide, and covered with a blanking plate (not shown) to be flush with the fiber compound layer 10.

The ice strike sheathing ring in accordance with the embodiment described in the above accordingly provides for undisturbed airflow along the closed inner fiber compound layer 10 (inner wall 20 of segment 3). The individual segments 3 are firmly attached to the fan casing 1 via their outer wall 21 adjoining the fan casing 1. The ice strike sheathing ring 4 is dimensioned such that the fan casing 1 is safely protected against ice strike of normal magnitude. Should ice strike, in exceptional cases, exceed the normal conditions, the inner wall 20 of the segments 3 will only be destroyed at the edges of break (breaking points 7) defined by the assembly holes 8 and the slots 9, so that fragments of limited size are produced which can pass the space between the exit guide vanes together with the engine airflow, thus avoiding blockage of the engine airflow and loss of engine thrust. Owing to the adhesive bond and the threaded safety connection, the outer wall 21 of the segments 3 of the ice strike sheathing ring 4 adjoining the fan casing 1 remains firmly attached to the fan casing.

The present invention is not limited to the embodiment described above. Depending on the type and service use of the engine, dimensioning and form of the segments and breaking points can be varied within the framework of the principal arrangement of breaking points according to the present invention.

LIST OF REFERENCE NUMERALS

1 Fan casing
2 Fan
3 Segment
4 Ice strike sheathing ring
5 Cavity
6 Fiber compound layer
7 Breaking point
8 Assembly hole
9 Slots
10 Outer fiber compound layer
11 Adhesive film
12 Threaded safety connection
13 Hole in 21
14 Locking bush
15 Elastic embedment
16 Locking bolt
17 Adapter
18 Washer
19 Locking nut
20 Inner wall of 3
21 Outer wall of 3

What is claimed is:

1. An ice strike sheathing ring for the fan casing of an aircraft gas turbine, comprising:
   a plurality of segments, each having several fiber compound layers, an inner wall exposed to engine airflow and possible ice strike, and an outer wall attached to the fan casing, the inner wall including a plurality of breaking points essentially extending in a direction of the engine airflow and generally positioned at a certain regular distance, the certain regular distance being selected such that fragments of the inner wall produced under extreme ice strike conditions can pass exit guide vanes downstream of a fan of the engine.

2. An ice strike sheathing ring in accordance with claim 1, wherein the breaking points comprise slots provided in the fiber compound layers of the inner wall one above the other or offset relative to each other, with a size and number of the slots per breaking point being variable and defining an amount of material weakening.

3. An ice strike sheathing ring in accordance with claim 2, wherein the slots are provided in at least one fiber compound layers, except the layer exposed to the engine airflow.

4. An ice strike sheathing ring in accordance with claim 2, wherein, in addition to the slots, the breaking points further comprise assembly holes provided in the inner wall.

5. An ice strike sheathing ring in accordance with claim 4, wherein two assembly holes arranged each at a certain distance from an edge of the segment are combined with a plurality of slots arranged between the assembly holes to form the breaking points.

6. An ice strike sheathing ring in accordance with claim 5, wherein the ring comprises a suite of six 60-degree segments and that the breaking points are provided with a 10-degree spacing.

7. An ice strike sheathing ring in accordance with claim 6, and further comprising:
   an adhesive layer connecting the outer wall of the ring to an inner surface of the fan casing, and
   a threaded safety connection additionally connecting the outer wall to the fan casing, so that the outer wall remains firmly attached to the fan casing without being destroyed even under extreme ice strike conditions.

8. An ice strike sheathing ring in accordance with claim 7, wherein the threaded safety connection comprises an elastic locating embedment positioned between the outer wall and the threaded safety connection to position the outer wall with respect to the casing, and a locking bush attached between the threaded connection and the outer wall to restrain the outer wall to the fan casing.

9. An ice strike sheathing ring in accordance with claim 8, and further comprising a blanking plate for covering the assembly holes flush with a surface of the inner wall.

10. An ice strike sheathing ring in accordance with claim 3, wherein the slots are provided in all fiber compound layers, except the layer exposed to the engine airflow.

11. An ice strike sheathing ring in accordance with claim 1, wherein the breaking points comprise assembly holes provided in the inner wall, and further comprising a blanking plate for covering the assembly holes flush with a surface of the inner wall.

12. An ice strike sheathing ring in accordance with claim 1, wherein the ring comprises a suite of six 60-degree segments and that the breaking points are provided with a 10-degree spacing.

13. An ice strike sheathing ring in accordance with claim 1, and further comprising:
   an adhesive layer connecting the outer wall of the ring to an inner surface of the fan casing, and
   a threaded safety connection additionally connecting the outer wall to the fan casing, so that the outer wall remains firmly attached to the fan casing without being destroyed even under extreme ice strike conditions.

14. An ice strike sheathing ring in accordance with claim 13, wherein the threaded safety connection comprises an elastic locating embedment positioned between the outer wall and the threaded safety connection to position the outer wall with respect to the casing, and a locking bush attached between the threaded connection and the outer wall to restrain the outer wall to the fan casing.

* * * * *